Patented Aug. 1, 1939

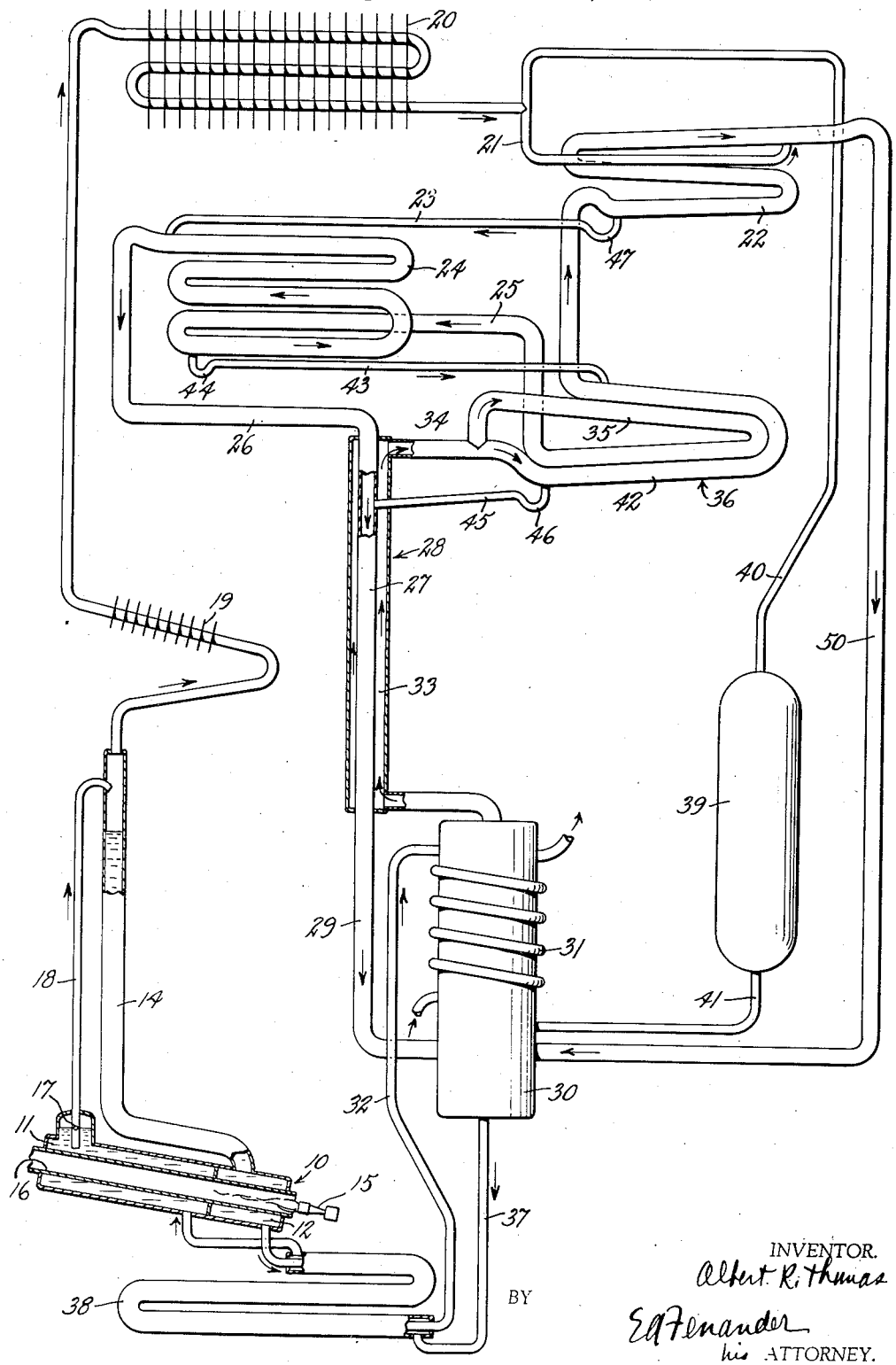

2,167,697

UNITED STATES PATENT OFFICE 2,167,697

REFRIGERATION

Albert R. Thomas, Evansville, Ind., assignor to Servel, Inc., New York, N. Y., a corporation of Delaware Application March 22, 1937, Serial No. 132,274
Renewed October 19, 1938

27 Claims. (Cl. 62—119.5)

My invention relates to refrigeration, and more particularly to a refrigeration system employing evaporation of refrigerant fluid in the presence of inert gas.

It is an object of the invention to improve the operation of refrigeration systems of this type, particularly to effect a lower refrigeration temperature.

I accomplish this by providing an auxiliary or branch circuit for inert gas wherein there takes place evaporation of liquid refrigerant flowing from a low temperature place of evaporation to cool inert gas entering the low temperature place of evaporation. This cooling may be by indirect heat transfer. This branch or auxiliary circuit may also be used directly or indirectly to cool refrigerant fluid flowing to the low temperature place of evaporation.

The invention, together with the above and other objects and advantages thereof, will be more fully understood upon reference to the following description and the accompanying drawing forming part of this specification and in which the single figure illustrates more or less diagrammatically a refrigeration system embodying the invention.

Referring to the drawing, I have shown the present improvement embodied in a refrigerating system of a uniform pressure absorption type, generally as described in Patent No. 1,609,334 to von Platen and Munters. The system includes a generator 10 having a rear chamber 11 and a forward chamber 12 communicating with an upward extending stand-pipe or separator 14. The generator contains a body of absorption liquid having a suitable refrigerant in solution therein, and, although I do not wish to be limited thereto, the absorption liquid and refrigerant may be water and ammonia, respectively.

The generator 10 may be heated in any suitable manner, as by a gas burner 15, which projects its flame into the forward end of a horizontal flue 16 extending through the generator. The heat applied to the generator causes ammonia vapor and absorption liquid in chamber 11 to pass through an opening 17 in the lower end of a small vertical conduit 18 which constitutes a vapor-lift and conducts ammonia vapor and absorption liquid to the upper part of stand-pipe 14. The liberated ammonia vapor entering stand-pipe 14 from conduit 18, as well as the ammonia vapor expelled from solution in stand-pipe 14 and chamber 12, flows upward through an air-cooled rectifier 19 in which accompanying water vapor is condensed and drains back to the generator 10. The expelled ammonia vapor is liquefied in an air-cooled condenser 20 and flows therefrom through a conduit 21, a liquid precooler 22 hereinafter to be described, and a conduit 23 into the upper end of an evaporator or cooling element 24. The conduit 21 is U-shaped at its lower end to provide a liquid seal for preventing non-condensible gas from entering the condenser 20.

An inert gas, such as hydrogen, enters the lower end of evaporator 24 from a conduit 25 in counter-flow to the liquid ammonia. The liquid ammonia evaporates and diffuses into the hydrogen with consequent absorption of heat from the surroundings of the evaporator 24. The resulting rich gas mixture of ammonia and hydrogen flows from evaporator 24 through conduit 26, inner passage 27 of a gas heat exchanger 28, and conduit 29 into the lower end of an absorber 30. The absorber is provided with a coil 31 through which a suitable cooling medium is circulated.

Ammonia is absorbed out of the rich gas mixture into weak absorption liquid which enters the upper part of the absorber 30 from a conduit 32. The hydrogen, which is practically insoluble and weak in ammonia, passes upward from the absorber 30 through the outer passage 33 of the gas heat exchanger 28, conduit 34, conduit 35 constituting part of an inert gas precooler 36 hereinafter to be described, and conduit 25 into the lower end of the evaporator 24. The gas heat exchanger 28 transfers heat from gas which is weak in ammonia and flows toward the evaporator 24 to gas which is rich in ammonia and flows to absorber 30.

The absorption liquid in absorber 30 becomes enriched in ammonia and flows through conduit 37 and the outer passage of a liquid heat exchanger 38 into chamber 11 of the generator. Liberated ammonia vapor causes absorption liquid to pass upward through vertical conduit 18 into the upper part of stand-pipe 14, as explained above, to a higher level than it is in absorber 30, and absorption liquid weak in ammonia flows from chamber 12 through the inner passage of the liquid heat exchanger 38 and conduit 32 into the upper end of absorber 30.

A vessel 39 is connected by conduit 40 to the lower end of condenser 20, and by conduit 41 to the gas circuit, as at the absorber 30, for example, so that any hydrogen which may pass into the condenser can flow to the gas circuit and not be trapped in the condenser. Ammonia vapor not liquefied in condenser 20 will flow through conduit 40 to displace hydrogen in vessel 39 and force such hydrogen through conduit 41 into the gas circuit, thereby raising the total pressure in the system so that an adequate condensing pressure is obtained to insure condensation of ammonia vapor in condenser 20.

In accordance with my invention, in order to provide a lower evaporator temperature, I provide a branch or auxiliary circuit including conduit 42 for dividing into two paths of flow the inert gas flowing toward evaporator 24 from absorber 30. Conduit 42 is connected to conduit 34 whereby part of the hydrogen flows through conduit 42 and the remainder flows through conduits 35 and 25 into the lower end of the evaporator. Conduits 35 and 42 are shown as having straight portions and bends, and are arranged in heat exchange relation. It is to be understood, however, that this is more or less diagrammatic, and that conduits 35 and 42 may assume any desired form and may be arranged in heat exchange relation in any suitable manner to provide the inert gas precooler 36.

To effect precooling of hydrogen flowing through conduit 35 to evaporator 24, liquid ammonia is introduced into the looped portion 42 of the branch circuit. Such liquid ammonia may be conducted from the lower end of evaporator 24 through conduit 43 to the upper part of looped conduit 42. Conduit 43 is U-shaped at 44 to provide a liquid seal to prevent gas in conduit 42 from entering the lower end of evaporator 24. The liquid ammonia in looped conduit 42 evaporates and diffuses into the hydrogen with consequent absorption of heat, and, since conduit 34 is in good heat exchange relation with conduit 42, heat is abstracted from hydrogen flowing in conduit 35 toward the evaporator. By precooling the hydrogen in conduit 34 before it enters the evaporator, a lower refrigerating temperature can be maintained by the latter.

Liquid ammonia that may collect in the lower part of the looped portion 42 of the branch circuit is preferably conducted to the gas heat exchanger. This may be done by providing a conduit 45 which is connected at one end to the looped portion 42 and its other end to the inner passage 27 of the gas heat exchanger 28 through which enriched gas flows back to absorber 30. To prevent flow of gas through conduit 45 it is provided with a U-shaped bend 46 at its upper end, whereby liquid ammonia will flow therein to provide a liquid seal.

Although the mixture of hydrogen and ammonia gas formed in looped conduit 42 of the auxiliary circuit can be returned directly to the absorber 30, I prefer to utilize this gas to cool liquid ammonia flowing from condenser 20 to evaporator 24. To this end the conduit constituting the branch circuit is extended upward from the looped portion 42 to provide the liquid precooler 22. Although the conduit constituting the auxiliary circuit is shown as having inclined straight portions and bends to provide the precooler 22, it is to be understood that this is more or less diagrammatic and that the liquid precooler may be formed in any suitable manner. The upper and lower parts of precooler 22 are connected to conduits 21 and 23, respectively, whereby liquid ammonia conducted from condenser 20 to evaporator 24 flows through the portion 22 of the auxiliary circuit. Conduit 23 is U-shaped at 47 to provide a liquid seal to prevent gas in the auxiliary circuit from entering evaporator 24.

The mixture of hydrogen and ammonia gas formed in the inert gas precooler 36 flows upward from the looped portion 42 of the auxiliary circuit through the looped portion 22. Since the partial vapor pressure of ammonia in the gas mixture is less than the vapor pressure of the warm liquid ammonia entering the looped portion 22 from condenser 20, liquid ammonia evaporates and diffuses into the gas mixture with consequent absorption of heat from the liquid ammonia. Liquid ammonia flows from the portion 22 of the auxiliary circuit through conduit 23 into evaporator 24, and, due to precooling of liquid ammonia in the auxiliary circuit, evaporation of ammonia takes place at a lower temperature in evaporator 24.

The gas flowing through precooler 22, which is partly enriched in ammonia in the inert gas precooler 36 and further enriched in the precooler 22, is returned to absorber 30. Since this enriched gas will be at a higher temperature than enriched gas formed in evaporator 24, due to the fact that it is in heat exchange with relatively warm liquid ammonia flowing from condenser 20, I prefer to return the enriched gas directly from liquid precooler 22 to the lower part of absorber 30 through conduit 50 of the branch circuit.

Besides lowering the evaporator temperature by providing the branch circuit for inert gas, which has just been described, the efficiency of the refrigerating system is improved in other respects. By precooling liquid ammonia before it enters the evaporator, for example, the temperature difference between liquid ammonia entering the evaporator and enriched gas at the upper part of the evaporator is reduced considerably. The enriched gas therefore leaves evaporator 24 and enters the gas heat exchanger 28 at a lower temperature. By encreasing the temperature difference between enriched gas flowing toward the absorber 30 and weak gas flowing toward the evaporator, heat is more effectively transferred from weak gas to enriched gas whereby additional cooling of gas flowing toward the evaporator is effected.

The evaporator 24 is arranged in heat exchange relation with the object to be cooled. When the evaporator 24 is disposed within a thermally insulated storage compartment of a refrigerator, it may also be desirable to arrange the liquid precooler 22 within the storage compartment. Since the evaporation of ammonia takes place at a higher temperature in liquid precooler 22 than in evaporator 24, the precooler 22 may be employed for cooling the food space or storage compartment of the refrigerator. In such case, the effective heat transfer surface may be increased by providing the liquid precooler 22 with a plurality of fins or other suitable heat transfer elements. Since evaporation of ammonia takes place at a lower temperature in evaporator 24 than in liquid precooler 22, the evaporator may be employed as a freezing unit.

The inert gas precooler 36 may also be arranged in the same storage compartment as the evaporator 24. The evaporator 24, due to precooling of inert gas, is capable of maintaining an object to be cooled at a lower temperature than precooler 36. Instead of arranging the inert gas precooler 36 or liquid precooler 22 or both of them in the same storage compartment with evaporator 24, they may be arranged together in a separate compartment or employed independently of each other in heat exchange relation with objects to be cooled.

While I have shown a single embodiment of the invention wherein both precooling of inert gas and liquid ammonia are effected, it is to be understood that the branch or auxiliary circuit may be utilized solely to precool inert gas flowing toward the evaporator. I therefore aim to cover all variations and modifications which come within the true spirit and scope of my invention, as pointed out in the following claims.

What is claimed is:

1. In the art of refrigeration with a system employing inert gas into which refrigerant evaporates, the improvement which consists in dividing inert gas flowing to a place of evaporation into two distinct paths of flow, conducting liquid from the place of evaporation to one of said paths of flow, and conducting inert gas in said other path of flow in heat exchange relation with said path of flow into which liquid is conducted and then to said place of evaporation.

2. In the art of refrigerating with a system employing inert gas, the improvement which consists in conducting inert gas first into the presence of liquid flowing from an evaporator and in heat exchange relation with inert gas flowing to the evaporator, and then into the presence of liquid flowing to the evaporator.

3. In the art of refrigerating with a system employing inert gas into which refrigerant evaporates, the improvement which consists in conducting inert gas, other than that flowing from an evaporator of the system, into the presence of liquid flowing from the evaporator and in heat exchange relation with inert gas flowing to the evaporator, and then in heat exchange relation with liquid flowing to the evaporator.

4. In the art of refrigerating with a system employing inert gas, the improvement which consists in conducting inert gas into the presence of and counter-current to liquid flowing from an evaporator of the system and in heat exchange relation with inert gas flowing to the evaporator, and then into heat exchange relation with liquid flowing to the evaporator.

5. In the art of refrigeration in which evaporation of liquid refrigerant takes place in the presence of inert gas flowing toward and away from a place of evaporation, the gas flowing toward the place of evaporation being in heat exchange relation with gas flowing away from the place of evaporation, the improvement which consists in diverting part of the gas flowing to the place of evaporation after being in heat exchange relation with gas flowing away from the place of evaporation, flowing the diverted gas in heat exchange relation only with the gas flowing to the place of evaporation, and conducting liquid refrigerant into the presence of the diverted gas.

6. In the art of refrigeration in which evaporation of liquid refrigerant takes place in the presence of inert gas flowing toward and away from a place of evaporation, the improvement which consists in conducting liquid from the place of evaporation into the presence of insert gas other than that flowing away from the place of evaporation, whereby such liquid evaporates and diffuses into the inert gas, and transferring heat to said liquid from inert gas flowing to the place of evaporation to precool the last-mentioned gas.

7. In the art of refrigeration in which evaporation of liquid refrigerant takes place in the presence of inert gas at a first place of evaporation and gas flows from the place of evaporation to a place of absorption and thence back to the place of evaporation, the improvement which consists in conducting liquid from the first place of evaporation to a second place of evaporation, flowing gas from the place of absorption into the presence of liquid at the second place of evaporation and then back to the place of absorption, and transferring heat to liquid at the second place of evaporation from inert gas flowing to the first place of evaporation to precool the last-mentioned gas.

8. In the art of refrigerating with a system employing inert gas, the improvement which consists in conducting a first stream of inert gas first in the presence of overflow liquid from an evaporator and then into heat exchange relation with liquid flowing to the evaporator, and conducting a second stream of inert gas through the evaporator.

9. In the art of refrigerating with a system employing inert gas, the improvement which consists in conducting inert gas first into the presence of overflow liquid from an evaporator and in heat exchange relation with inert gas flowing to the evaporator, and then out of heat exchange relation with inert gas flowing to the evaporator and into heat exchange relation with liquid flowing to the evaporator.

10. In the art of refrigeration employing a system using inert gas into which refrigerant evaporates at a first place of evaporation, the improvement which consists in flowing inert gas to a second place of evaporation and into the presence of liquid overflowing from the first place of evaporation, and then to a third place of evaporation to which liquid is conducted, the inert gas flowing from the second to the third place of evaporation without flowing to said first place of evaporation.

11. In the art of refrigeration in which evaporation of liquid refrigerant takes place in the presence of inert gas flowing toward and away from a place of evaporation, the gas flowing toward the place of evaporation being in heat exchange relation with gas flowing away from the place of evaporation, the improvement which consists in diverting part of the gas flowing to the place of evaporation after being in heat exchange relation with gas flowing away from the place of evaporation, flowing the diverted gas in heat exchange relation with the gas from which it is diverted and flowing to the place of evaporation, and conducting liquid refrigerant into the presence of the diverted gas.

12. In the art of refrigeration in which evaporation of liquid refrigerant takes place in the presence of inert gas flowing toward and away from a place of evaporation, the improvement which consists in conducting liquid from the place of evaporation into the presence of inert gas other than that flowing away from the place of evaporation to produce a refrigerating effect, and utilizing the refrigerating effect thus produced to precool inert gas flowing only to the place of evaporation.

13. In the art of refrigeration in which evaporation of liquid refrigerant takes place in the presence of inert gas flowing toward and away from a place of evaporation, the gas flowing toward the place of evaporation being in heat exchange relation with gas flowing away from the place of evaporation, the improvement which consists in diverting part of the gas flowing to the place of evaporation after being in heat exchange relation with gas flowing away from the place of evaporation, flowing the diverted gas in heat exchange relation with the gas flowing to the place of evaporation, and conducting liquid refrigerant into the presence of the diverted gas and then into the presence of gas flowing away from the place of evaporation.

14. In the art of refrigeration in which evaporation of liquid refrigerant takes place in the presence of inert gas flowing toward and away from a first place of evaporation, the gas flowing toward the place of evaporation being in heat exchange with gas flowing away from the place of evaporation, the improvement which consists in diverting part of the gas flowing to the place of evaporation after being in heat exchange relation with gas flowing away from the place of evaporation, flowing the diverted gas to a second place of evaporation in heat exchange relation with gas flowing to the first place of evaporation, conducting liquid refrigerant to the second place of evaporation, flowing the diverted gas from the second place of evaporation to a third place of evaporation, and conducting liquid refrigerant to the third place of evaporation.

15. In the art of refrigeration in which evaporation of liquid refrigerant takes place in the presence of inert gas flowing toward and away from a first place of evaporation, the gas flowing toward the place of evaporation being in heat exchange relation with gas flowing away from the place of evaporation, the improvement which consists in diverting part of the gas flowing to the place of evaporation after being in heat exchange relation with gas flowing away from the place of evaporation, flowing the diverted gas to a second place of evaporation, conducting liquid from the first place of evaporation to the second place of evaporation, and flowing the diverted gas from the second place of evaporation in heat exchange relation with liquid flowing to the first place of evaporation.

16. In the art of refrigeration in which evaporation of liquid refrigerant takes place in the presence of inert gas at a first place of evaporation and gas flows from the place of evaporation to a place of absorption and thence back to the place of evaporation, the improvement which consists in conducting liquid from the first place of evaporation to a second place of evaporation, flowing gas from the place of absorption to the second place of evaporation in which evaporation of the liquid takes place to produce a refrigerating effect, flowing gas from the second place of evaporation back to the place of absorption, and utilizing the refrigerating effect produced at the second place of evaporation to precool inert gas flowing only to the first place of evaporation.

17. In the art of refrigeration in which evaporation of liquid refrigerant takes place in the presence of an inert gas at a first place of evaporation and gas flows from the place of evaporation to a place of absorption and back to the place of evaporation, the improvement which consists in conducting liquid from the first place of evaporation to a second place of evaporation, flowing gas from the place of absorption to the second place of evaporation in which the liquid therein evaporates, transferring heat from gas flowing to the first place of evaporation to liquid in the second place of evaporation, and flowing gas from the second place of evaporation back to the place of absorption in a path of flow which is out of heat exchange relation with the gas flowing from the first place of evaporation to the place of absorption.

18. In the art of refrigeration in which evaporation of liquid refrigerant takes place in the presence of an inert gas at a place of evaporation, gas flows from the place of evaporation to a place of absorption, and gas flows back to the place of evaporation from the place of absorption and in heat exchange relation with gas flowing toward the place of absorption, the improvement which consists in diverting part of the gas flowing to the place of evaporation after being in heat exchange relation with gas flowing toward the place of absorption, flowing the diverted gas in a separate path and in heat exchange relation with the gas from which it is diverted and flowing to the place of evaporation, and supplying liquid refrigerant to the path of flow of the diverted gas.

19. In the art of refrigeration in which evaporation of liquid refrigerant takes place in the presence of an inert gas at a first place of evaporation, gas flows from the place of evaporation to a place of absorption, and gas flows back to the place of evaporation from the place of absorption and in heat exchange relation with gas flowing toward the place of absorption, the improvement which consists in diverting part of the gas flowing to the place of evaporation after being in heat exchange relation with gas flowing toward the place of absorption, flowing the diverted gas in heat exchange relation with the gas from which it is diverted and flowing to the place of evaporation, and supplying liquid refrigerant from the place of evaporation into the path of flow of the diverted gas.

20. In the art of refrigeration in which liquid refrigerant conducted to a place of evaporation evaporates in the presence of an inert gas, gas flows from the place of evaporation to a place of absorption, and gas flows back to the place of evaporation from the place of absorption and in heat exchange relation with gas flowing toward the place of absorption, the improvement which consists in diverting part of the gas flowing to the place of evaporation after being in heat exchange relation with gas flowing toward the place of absorption, flowing the diverted gas in heat exchange relation with the gas flowing to the place of evaporation and into the presence of liquid overflowing from the place of evaporation, and thereafter flowing the diverted gas into heat exchange relation with liquid conducted to the place of evaporation.

21. In the art of refrigeration in which evaporation of liquid refrigerant takes place in the presence of an inert gas at a first place of evaporation, gas flows from the place of evaporation to a place of absorption, and gas flows back to the place of evaporation from the place of absorption and in heat exchange relation with gas flowing toward the place of absorption, the improvement which consists in diverting part of the gas flowing to the first place of evaporation after being in heat exchange relation with gas flowing toward the place of absorption, flowing the diverted gas to a second place of evaporation, supplying liquid refrigerant to the second place of evaporation, and flowing gas from the second place of evaporation to the place of absorption and out of heat exchange relation with gas flowing from the first place of evaporation to the place of absorption.

22. In a refrigerating system, an evaporator, a precooler having separate paths, means to conduct inert gas through a first path of said precooler and to said evaporator, means to conduct inert gas other than that flowing from said evaporator through a second path of said precooler, and means to conduct liquid from the evaporator to said second path of the precooler.

23. In a refrigerating system, an evaporator, conduit means to conduct liquid to said evaporator, a precooler having separate paths, means to conduct inert gas through a first path of said precooler and to said evaporator, means to conduct liquid from said evaporator to a second path of the precooler, and means to conduct inert gas through the second path of said precooler and then through at least a part of said conduit means conducting liquid to said evaporator.

24. In a refrigerating system, an evaporator, first and second heat exchangers having separate paths, means to conduct inert gas to said evaporator successively through a first path of said first and second heat exchangers, means to conduct inert gas from said evaporator through a second path of said first heat exchanger, means to divert inert gas from the first path of said first heat exchanger and to conduct such gas through a second path of said second heat exchanger, and means to conduct liquid from the evaporator to the second path of said second heat exchanger.

25. In a refrigerating system, a primary evaporator, an absorber, means for conducting a cooling agent into said primary evaporator, means for conducting absorption liquid to and from said absorber, means providing a main circuit for circulating an auxiliary agent between said absorber and said primary evaporator, an auxiliary evaporator in heat exchange relation with said main circuit, means providing a branch circuit for circulating auxiliary agent between said absorber and said auxiliary evaporator, and means to conduct only liquid from said primary evaporator to said auxiliary evaporator.

26. In the art of refrigeration employing a system using inert gas into which refrigerant evaporates at a place of evaporation, the improvement which consists in precooling inert gas flowing to the place of evaporation by evaporation of liquid into gas which has been diverted from gas flowing to the place of evaporation, said liquid overflowing from the place of evaporation.

27. In the art of refrigeration employing an auxiliary agent into which refrigerant evaporates at a place of evaporation, the improvement which consists in pre-cooling auxiliary agent flowing to the place of evaporation by evaporation of liquid refrigerant from said place of evaporation into auxiliary agent other than that flowing from said place of evaporation.

ALBERT R. THOMAS.